United States Patent [19]

Boscher et al.

[11] Patent Number: 5,545,852
[45] Date of Patent: Aug. 13, 1996

[54] ARRANGEMENT FOR MULTIPLE CABLE INTRODUCTIONS IN CABLE SLEEVES

[75] Inventors: Georg Boscher; Klaus Amrhein, both of Hagen; Dieter Sagemuehl, Herdecke, all of Germany

[73] Assignee: RXS Schrumpftechnik-Garnituren GmbH, Hagen, Germany

[21] Appl. No.: 451,748

[22] Filed: May 26, 1995

Related U.S. Application Data

[63] Continuation of Ser. No. 103,029, Aug. 6, 1993, abandoned.

[30] Foreign Application Priority Data

Aug. 19, 1992 [DE] Germany .......................... 42 27 442.7

[51] Int. Cl.$^6$ ........................... H01R 4/00; H02G 15/04; H02G 3/22
[52] U.S. Cl. .................. 174/84 R; 174/84 S; 174/88 R; 174/93; 439/932; 439/730; 439/559; 439/562
[58] Field of Search ................ 174/84 S, 84 R, 174/88 R, 91, 92, 93; 439/730, 559, 562, 565, 571, 932

[56] References Cited

U.S. PATENT DOCUMENTS

| 2,552,686 | 5/1951 | Melcher | 439/559 |
|---|---|---|---|
| 2,666,804 | 1/1954 | Gross | 439/271 |
| 2,666,805 | 1/1954 | Smith | 439/271 |
| 3,215,613 | 11/1965 | Lainson | 174/93 |
| 3,236,934 | 2/1966 | Revelle | 174/88 R |
| 3,408,450 | 10/1968 | Kleinfelder | 174/88 R |
| 3,423,518 | 1/1969 | Weagant | 174/153 |
| 3,695,642 | 10/1972 | DeWoody | 174/84 R |
| 4,090,029 | 5/1978 | Lundenberg | 174/51 |
| 4,145,075 | 3/1979 | Holzmann | 439/559 |
| 4,519,662 | 5/1985 | Riley | 439/271 |
| 4,822,293 | 4/1989 | Robson | 439/559 |
| 5,318,459 | 6/1994 | Shields | 439/565 |

FOREIGN PATENT DOCUMENTS

| 7516723 | 2/1977 | Germany . | |
| 2618347 | 11/1977 | Germany | 439/271 |
| 3242073 | 5/1984 | Germany . | |
| 9006229 | 8/1990 | Germany . | |
| 4208285 | 9/1993 | Germany . | |
| 928518 | 6/1963 | United Kingdom | 174/93 |
| 2172449 | 9/1986 | United Kingdom | 174/93 |
| WO90/07812 | 7/1990 | WIPO . | |

*Primary Examiner*—Leo P. Picard
*Assistant Examiner*—Stephen T. Ryan
*Attorney, Agent, or Firm*—Hill, Steadman & Simpson

[57] ABSTRACT

An arrangement for multiple cable introductions into cable sleeves composed of a seal or end member having a plurality of cable introduction nipples characterized by the introduced cables being received in the introduction nipples and being sealed thereto with shrink hose sections. The cable introduction nipples are fixed pressure-tight in admission bores of the seal member or at admission nipples which are provided at the admission bores of the seal members by utilizing nuts engaging threads on one of the nipples and entrapping a sealing insert.

23 Claims, 3 Drawing Sheets

ARRANGEMENT FOR MULTIPLE CABLE INTRODUCTIONS IN CABLE SLEEVES

This is a continuation of application Ser. No. 08/103,029, filed Aug. 6, 1993, now abandoned.

BACKGROUND OF THE INVENTION

The present invention is directed to an arrangement for multiple cable introductions in a cable sleeve composed of a seal member having a plurality of cylindrical cable introduction nipples and shrink hose sections put into place thereon. The invention is also directed to the method for the manufacture of such an arrangement.

In Publication WO 90/07812, a splicing housing for cables wherein a seal member has multiple cable introductions is disclosed. This seal member comprises a plurality of rigidly applied, cylindrical cable introduction nozzles, to whose ends shrink hose sections are attached. The shrink hose sections are shrunken onto any cable introduced into the nozzle by the application of heat. This is an arrangement which has a prescribed plurality of cable introductions, wherein the cable introductions are also permanently prescribed in terms of diameter dimension. Moreover, certain difficulties will occur when shrinking the shrink hose section, since the application of heat when shrinking one shrink hose section can also influence the neighboring shrink hose section. Work must, therefore, be carried out extremely carefully and, potentially, with suitable heat-protection devices.

SUMMARY OF THE INVENTION

The object of the present invention is to create an arrangement for multiple cable introductions wherein the described risks are not present and wherein the mounting of the cable introductions should also be facilitated. This object can be achieved with an arrangement of an introduction nipple having a seal or a shrink hose section in that a seal member comprises a plurality of admission bores into which cable introduction nipples can be placed as needed, and the cable introduction nipples have an all-around sealing flange which engages a sealing insert that is arranged between the sealing flange and the sealing surface of the seal member facing toward the sealing flange. Each of the cable introduction nipples has a thread that is on its insertion end and this receives a threaded nut which can be threaded onto the introduction nipple to apply pressure to the sealing insert disposed between the flange and sealing surface of the sealing member.

In a second solution to the above object, the second arrangement also includes the seal member comprising a plurality of admission bores with admission nipples in which the cable introduction nipples can be attached as needed, each of the cable introduction nipples comprises an outer sealing flange, every cable introduction nipple having a union nut that is supported to surround the sealing flange, the admission nipple can be introduced into every admission bore and every admission nipple also has a sealing flange at one end which entraps a first sealing insert and at the other end the admission nipple has external threads which will receive a nut so that after introduction of the nipple, the nut can be threaded onto the threads to apply a pressure on the first sealing insert and then a union nut is threaded on the exposed thread to place a second sealing part or insert and the sealing flange into a sealing condition.

In the third solution, the arrangement of the species initially set forth has the sealing member having the admission nipple integral therewith and every admission nipple comprises threads on its outer end and every cable introduction nipple to be attached comprises an all-around sealing flange at one end and comprises a union nut supported thereagainst, the union nut can be threaded pressure-tight onto the threads of the admission nipple to engage a sealing insert which is received adjacent the sealing flange so that the cable introduction nipple is fixed.

In addition to the above solutions, each of the sealing members of the solutions can be a divided member which will have additional cable introduction openings in the parting plane that will receive the introduction nipples.

Significant advantages over the cited art may now be seen with the arrangement of the invention in that the arrangement of the cable and the multiple cable introduction need not occur at the seal member in all of the proposed solutions and need not occur in tight union with the cable introduction. Instead, every cable introduction can be separately undertaken or, respectively, prepared so that the mounting is significantly simplified and such that a mutual influencing during the shrink process cannot occur. First, separate cable introduction nipples are employed in the embodiments of the present invention into which the cables are introduced and are fixed and sealed by shrinking shrink hose sections or members to form a pre-assembled unit or introduction nipple. Only then are these mounted arrangements tightly introduced into the admission bores or admission nipples of the seal member, namely with mechanical means so that the application of heat otherwise used for shrinking is no longer necessary. The sealing and fixing of the individual, completely mounted cable introduction now takes on an extremely simple form and the risk of mutual influencing is no longer established. The possibility of selecting different cable introduction nipples with or without terminations establishes another great advantage. As a result thereof, namely, the cable introductions can be optimally matched to the required conditions. Thus, further cable introductions can be retrofitted at a later point in time without those already existing being influenced. Due to the simple connection techniques, for example, cables together with their cable introduction nipples can now be replaced without the cable introduction thereby suffering any damage. This connection technique thus offers many possibilities so that it offers advantages not only for the original mounting but also for later, desired applications.

Other advantages and features of the invention will be readily apparent from the following description of the preferred embodiments, the drawings and claims.

DESCRIPTION OF THE PREFERRED EMBODIMENTS

Figure 1:
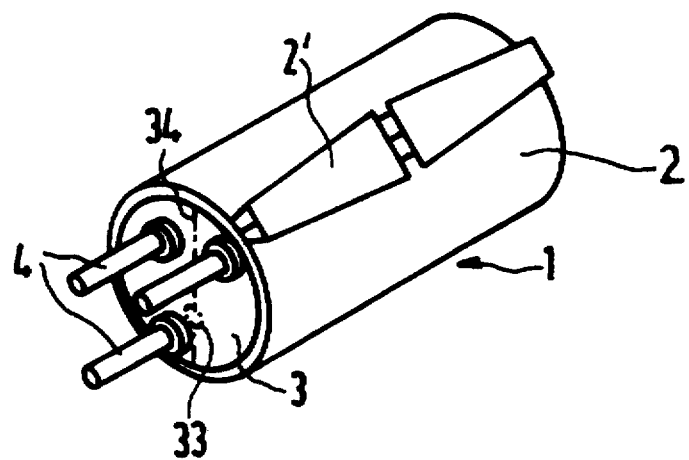
FIG. 1 is a perspective view of a cable sleeve having an insertion region for multiple cable introductions.

The principles of the present invention are particularly useful when incorporated in a cable sleeve, generally indicated at 1 in FIG. 1. The cable sleeve 1 is essentially composed of a socket pipe arrangement or sleeve 2 that is tightly drawn over seal members or end members 3 which are arranged at each of the end faces. The socket pipe 2, for example, can be closed with wedge-shaped, longitudinal closing elements 2'. A plurality of cable introduction nipples 4 are then arranged in the seal member 3 with the required plurality of cables being introduced through these nipples 4 as needed. The cable introduction nipples 4 can be introduced by themselves in accordance with the invention, wherein a multitude of possibilities are established, as already pointed out above. Thus, for example, cable introduction nipples 4 having different diameters, with or without a tight closure, and with various connections can be utilized, as set forth below with reference to the further Figures.

Figure 2:
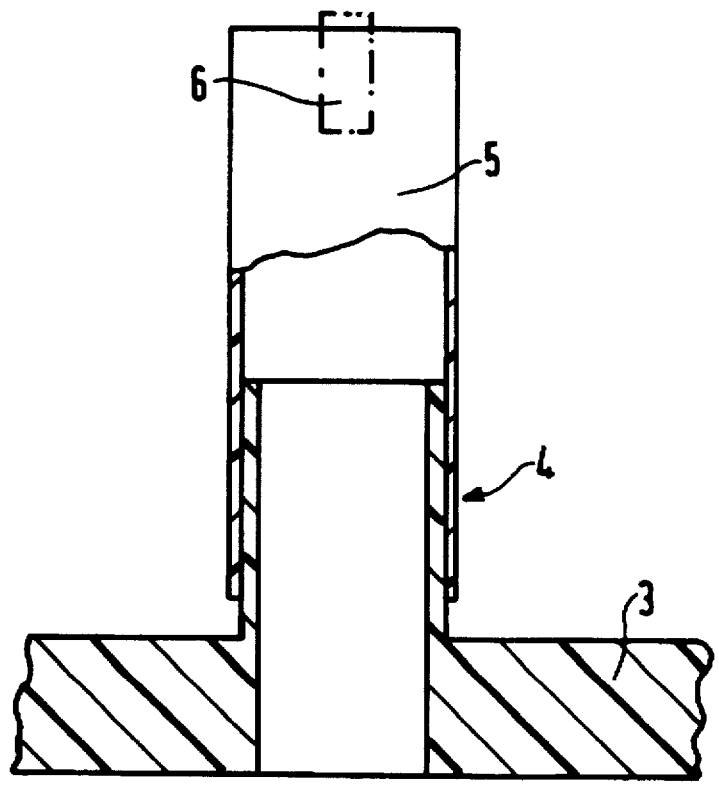
FIG. 2 is a side view with portions broken away for purposes of illustration of a seal member having a firmly applied cable introduction nipple.

One possibility of introducing cables, wherein the introduction is undertaken in a known way through an admission nipple which is part of the seal member, is illustrated in FIG. 2. A shrink hose 5 is shrunken onto the introduced cables of the admission nipple generally indicated at 4. Upon introduction of a plurality of cables through this admission nipple, appropriate measures for sealing the gore regions or spaces between the introduced cables can be undertaken at the end of the shrink hose section 5, for example, by providing a known clamp element 6 with or without sealing inserts.

Figure 3:
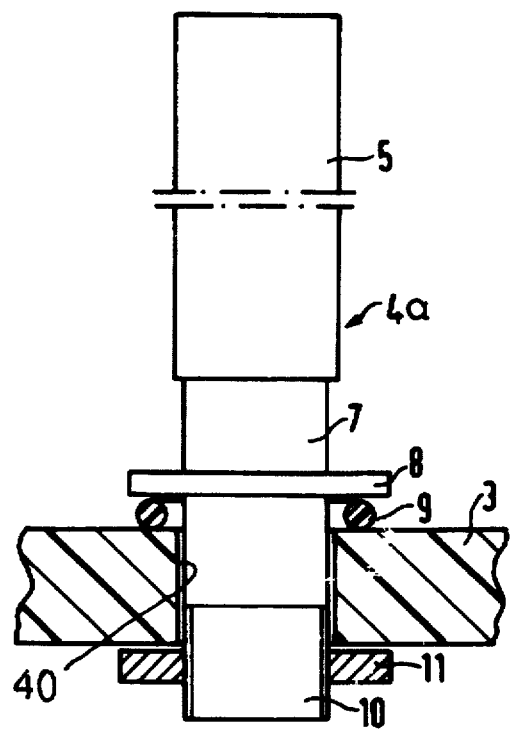
FIG. 3 is a partial cross sectional view of a first exemplary embodiment of the present invention with portions in elevation for purposes of illustration.

A cable introduction nipple, generally indicated at 4a in FIG. 3, is composed of a shrink hose section 5 and a tubular introduction part 7. The tubular introduction part 7 has a radially-extending flange 8 which extends around the circumference of the introduction part. An end of the introduction part is provided with threads 10 onto which a nut 11 can be threaded. As needed, the cable introduction nipple 4a can then have its threaded end 10 introduced into one of the admission bores 40 of the seal or end member 3, whereby a sealing insert 9, for example an O-ring or a ring-shaped flat seal, is previously slipped onto the member 7. After the introduction of the cable introduction nipple 4a, the nut 11 is then threaded on the opposite side so that the cable introduction nipple 4a is tightly fixed and the sealing insert 9 is pressed against a respective admission bore between the continuous sealing flange 8 and the sealing surface of the seal or end member 3. In this way, a seal is provided between the cable introduction nipple 4a and the end member. Quite generally, the sealing insert 9 in all exemplary embodiments can be arranged both at the outside as well as at the inside of the seal member 3, whereby the arrangement at the inside is to be preferred because of the better protection. In this latter embodiment, an additional washer should then be required in the exemplary embodiment so that the sealing insert 9 is not injured during threading of the nut 11 onto the threads 10. If no cable is to be inserted, a cap-shaped termination that provides a tight closure for non-occupation and that need only be cut off when needed could be selected as the shrink hose section 5.

Figure 4:
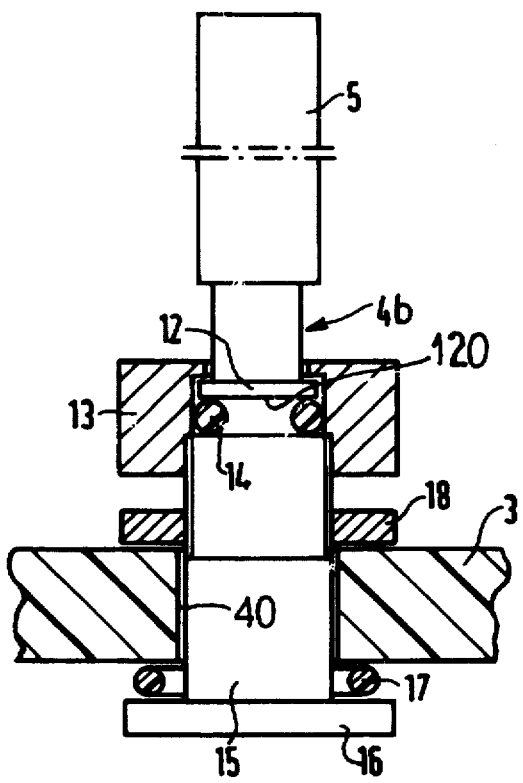
FIG. 4 is a partial cross sectional view with portions in elevation for purposes of illustration of a second embodiment of the present invention.

A second exemplary embodiment of the invention is shown by a cable introduction nipple, generally indicated at 4b in FIG. 4, and this introduction nipple can be threaded onto an admission nipple 15, which is already mounted on the admission bore 40 of a seal member 3. This admission nipple 15 comprises an all-around sealing flange 16 on one end, wherein this will press the sealing insert 17 against the sealing surface of the seal member 3. This pressing occurs by threading a nut 18 on a thread situated at the second end of the admission nipple 15. In this way, the admission bore of the seal member 3 is already equipped with the connecting unit for the actual cable introduction nipple 4b. The cable introduction nipple 4b, likewise, has an all-around sealing flange 12 providing a groove 120 for receiving a second sealing insert 14. A union nut or a nut with an inwardly directed flange 13 is supported on the flange 12 and is screwed or threaded onto the threaded end of the admission nipple 15. Thus, the sealing insert 14, which is in the groove 120, will provide a sealing in the parting plane which is thereby, likewise, placed in the parting plane with the union nut or flanged nut 13.

Figure 5:
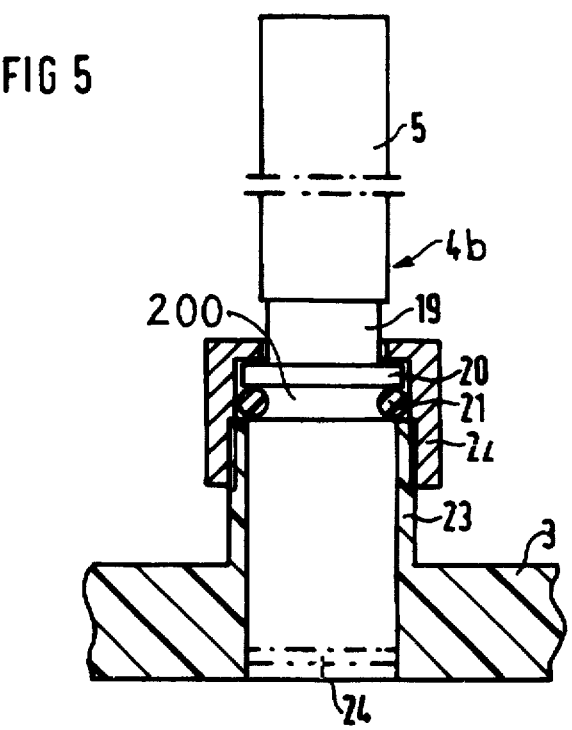
FIG. 5 is a partial cross sectional view with portions in elevation of a third embodiment of the present invention.

Another embodiment of the invention utilizes the cable introduction nipple 4b of FIG. 4 and is illustrated in FIG. 5. In this embodiment, an attachment of a tubular part 19 of the cable introduction nipple 4b with the assistance of a union nut 22 and of a sealing insert 21 occurs. The support of the union nut 22 occurs first at an all-around sealing flange 20, which is on the tubular part 19, and provides a groove 200 for receiving a sealing insert 21. The support of the union nut 22 occurs, first, at an all-around sealing flange 20 of the tubular part 19, whereas, on the other hand, the threaded part of the union nut 22 engages on the threads of the admission nipple 23, which is integrally formed with the seal member 3. In addition, as indicated here, the termination can also be implemented by a break-off insert 24, whereby the arrangement can be undertaken at an arbitrary location within the tubular part. As needed, this termination part 24 can be broken off so that the introduction opening can be used.

Figure 6:
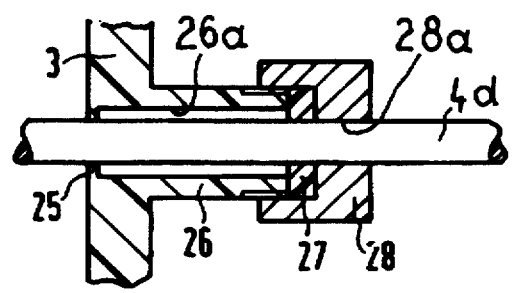
FIG. 6 is a cross sectional view with portions in elevation of a stuffing box seal utilized with the present invention.

In FIG. 6, an exemplary embodiment wherein the cable introduction nipple is even replaced by a union nut 28 having a type of stuffing box end seal 27. The union nut 28 is threaded here onto an applied admission nipple 26 with threads until the stuffing box seal 27 has achieved the necessary sealing effect on an item, such as 4d, that is inserted through a bore 28a of the nut 28 and a bore 26a of the nipple 26. This arrangement is expediently applied to the inwardly directed side of the seal member. As protection, a type of lip seal 25 may be formed by an all-around lamella on the inner wall of the bore 26a.

Figure 7:
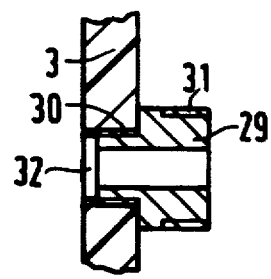
FIG. 7 is a cross sectional view showing the attachment of the nipple to a sealing member in accordance with the present invention.

In FIG. 7, an admission bore or opening 32 is provided in the end member 3 and can be provided with threads 30, so that the threaded cable admission nipple or attachment 29 for an arrangement fashioned as a stuffing box can be directly threaded, for example, as illustrated. The illustrated attachment 29 has outside threads 31 for engagement with the union nut or the like. The attachment 29 is shown here as an offset part; however, it can also be fashioned as a uniformly thick nipple part having a through-thread or continuous threads.

The seal or end member 3 can also, additionally, be transversely divided in a way known per se, wherein the admission openings, such as 33 (FIG. 1) are introduced in a parting plane 34 of the end member 3. Given such a determination of the cable sleeve, uncut cables 4d can also be additionally introduced or, respectively, brought out in addition to the admissions having the above-disclosed cable introductions in the parting plane 34. The parting plane 34 is sealed with a suitable sealing material.

The cable introduction nipples can be composed both of metal, as well as plastic. The metal can also be plastic-coated.

Although various minor modifications may be suggested by those versed in the art, it should be understood that we wish to embody within the scope of the patent granted hereon all such modifications as reasonably and properly come within the scope of our contribution to the art.

We claim:

1. In an arrangement for multiple cable introductions in cable sleeves composed of a seal member having a plurality of cylindrical cable introduction nipples and shrink hose sections put in place thereon, the improvement comprising each introduction nipple receiving a cable and having the shrink hose section associated therewith shrunk onto the nipple and cable to form a pre-assembled unit, the seal member having a plurality of admission bores into which cable introduction nipples of the pre-assembled units can be placed, as needed, each of said cable introduction nipples comprising an all-around peripheral sealing flange, an insertion end being provided with threads, said introduction nipple being received in one of the admission bores with a sealing insert disposed between the flange and a sealing surface of the seal member, and a nut being threaded on the threads of the introduction nipple for clamping the sealing insert between the sealing surface and flange.

2. In an arrangement according to claim 1, wherein each cable introduction nipple being formed of metal.

3. In an arrangement according to claim 2, wherein the cable introduction nipple is coated with a plastic coating.

4. In an arrangement according to claim 1, wherein each of the unoccupied cable introduction nipples is provided with a cap-like termination.

5. In an arrangement according to claim 1, wherein each introduction nipple being provided with a break-off closure wall.

6. In an arrangement according to claim 1, wherein a plurality of cables are introduced into one of the introduction nipples, each of the introduction nipples including a shrink hose section with the gore regions between the introduced cables being sealed with a clamping element engaging the portions of the hose section.

7. In an arrangement according to claim 1, wherein the seal member is divided and has additional cable introduction openings in a parting plane forming the divide of the seal member.

8. In an arrangement according to claim 1, wherein the sealing insert is an O-ring.

9. In an arrangement according to claim 1, wherein the sealing insert is engaged between an outside surface of the seal member and the flange of the introduction nipple.

10. In an arrangement according to claim 1, wherein the sealing insert is seated between an inside surface of the seal member and the flange.

11. In an arrangement for multiple cable introductions in cable sleeves, said arrangement including a seal member having a plurality of cable introduction nipples and shrink hose sections put in place thereon, the improvements comprising each introduction nipple receiving a cable and having the shrink hose section associated therewith shrink onto the nipple and cable to form a pre-assembled unit, the seal member having a plurality of admission bores, an admission nipple being introduced into every admission bore, each admission nipple having a passageway, a first all-around sealing flange at one end and being threaded at the opposite end, a first nut received on said threads for holding the admission nipple in an admission bore with a first sealing insert disposed between the flange and said seal member, each cable introduction nipple having a peripheral flange, a cable of one of said pre-assembled units being introduced into the passageway of the admission nipple with a second sealing insert positioned between the peripheral flange of the introduction nipple of the unit and the opposite end of the admission nipple, and a second nut engaging said peripheral flange and being threaded on the admission nipple to form a pressure-tight connection between the cable introduction nipple of the unit and the admission nipple.

12. In an arrangement according to claim 11, wherein each of the first and second sealing inserts are O-rings.

13. In an arrangement according to claim 11, wherein said admission nipple and cable introduction nipple as formed of metal.

14. In an arrangement according to claim 13, wherein the cable introduction nipple is coated with a plastic coating.

15. In an arrangement according to claim 11, wherein the cable introduction nipple is composed of plastic.

16. In an arrangement according to claim 11, wherein one of said admission nipple and introduction nipple is provided with a break-off closure wall.

17. In an arrangement according to claim 11, wherein a plurality of cables are introduced into one of the introduction nipples, each of the introduction nipples including a shrink hose section with the gore regions between the introduced cables being sealed with a clamping element engaging the portions of the hose section.

18. In an arrangement according to claim 11, wherein the seal member is divided and has additional cable introduction openings in a parting plane forming the divide of the seal member.

19. An arrangement for multiple cable introduction in a cable sleeve, said arrangement comprising a seal member having integral admission nipples extending from one surface, each admission nipple having an admission bore and having threads on a free end, a cable introduction nipple having a flange, said cable introduction nipple receiving a cable and having a shrink hose section associated therewith shrunk onto the introduction nipple and cable to form a pre-assembled unit, said cable of the pre-assembled unit being received in the admission bore with a seal insert between the flange and the free end of the admission nipple, and a nut threaded onto the threads of the admission nipple and engaging the flange to fix the introduction nipple on the admission nipple with a fluid-tight seal.

20. An arrangement according to claim 19, wherein one of said admission nipple and introduction nipple is provided with a break-off closure wall.

21. An arrangement according to claim 19, wherein the seal insert is an O-ring.

22. An arrangement according to claim 19, wherein the cable introduction nipple is composed of plastic.

23. An arrangement according to claim 19, wherein a plurality of cables are introduced into one of the introduction nipples with gore regions between the introduced cables being sealed with a clamping element engaging the portions of the shrink hose section.

* * * * *